July 20, 1937.  E. G. SIMPSON  2,087,821
WINDOW ASSEMBLY FOR AUTOMOTIVE VEHICLES
Filed June 20, 1932  2 Sheets—Sheet 1

INVENTOR
Emory Glenn Simpson
BY
Barnes, Kisselle & Laughlin
ATTORNEYS

July 20, 1937.  E. G. SIMPSON  2,087,821
WINDOW ASSEMBLY FOR AUTOMOTIVE VEHICLES
Filed June 20, 1932  2 Sheets-Sheet 2

INVENTOR
Emory Glenn Simpson
BY Barnes, Kisselle & Laughlin
ATTORNEYS

Patented July 20, 1937

2,087,821

UNITED STATES PATENT OFFICE 2,087,821

WINDOW ASSEMBLY FOR AUTOMOTIVE VEHICLES

Emory Glenn Simpson, Detroit, Mich., assignor to Ternstedt Manufacturing Company, Detroit, Mich., a corporation of Michigan Application June 20, 1932, Serial No. 618,188

15 Claims. (Cl. 296—44)

This invention relates to a window assembly for an automotive vehicle.

A window assembly for an automotive vehicle of the type having one glass panel slidable upwardly and downwardly and another pivoted to swing outwardly to serve as a wind deflector is old in the art.

It is an object of this invention to produce a window assembly of this general type having a pivoted panel and a panel arranged to be raised and lowered, in which the pivoted panel can be swung from its normally closed position so as to be disposed at an angle to the slidable panel to serve either as a wind deflector or a wind scoop, and in which the slidable panel is arranged, when in raised position, to lock the pivoted panel in window closing position.

It is an object of this invention to produce a window assembly in which the window comprises two glass panels, one of which is pivotally mounted to swing in and out of the plane of the other which is slidably mounted and in which the panels have correspondingly inclined edges one of which carries a member which serves as a lock to secure the pivoted panel against pivotal movement when the sliding panel is in raised or partially raised position.

It is an object of this invention to produce a window assembly including a glass panel pivoted at its top and bottom edges in a window opening provided with a weatherstrip which serves as a stop to prevent the window from being swung inwardly into a position which will interfere with the driver as he normally operates the steering wheel. This weatherstrip also serves as a stop for the pivoted panel to align the two panels so that they will interlock or interengage in sealing relation when the two panels close the window opening.

It is an object of this invention to produce a window assembly of the type having a glass panel pivoted at its top and bottom edges between its front and rear vertical edges that can be swung outwardly in the same direction to serve first as a wind deflector and then reverse itself to serve as a scoop for deflecting the air into the body.

Among the further objects of this invention is that of producing a ventilating window assembly of the type having a slidable panel and a pivoted panel which can be operated for ventilating purposes in the rain and yet prevent entry of the rain into the vehicle body.

In the drawings:

Figure 3 is a section along the line 3—3 of Figure 1.

Figure 5 is a section along the line 5—5 of Figure 1.

Figure 6 is a section along the line 6—6 of Figure 5.

Figure 1:
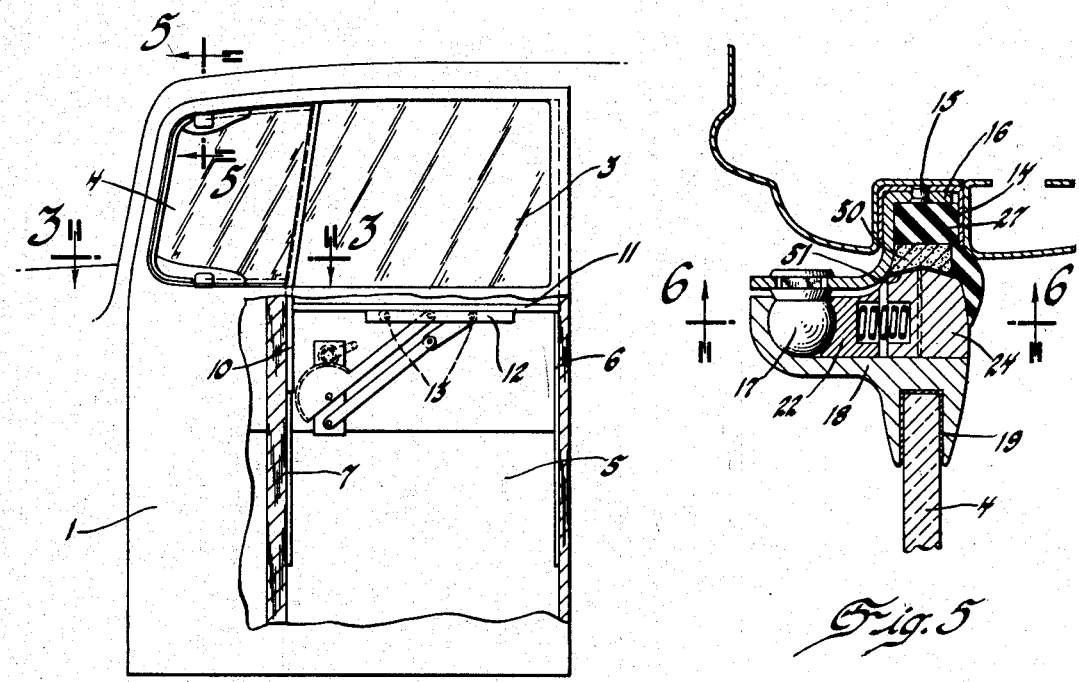
Figure 1 is a fragmentary view of a front door of an automotive vehicle showing the window assembly with both the pivoted and the sliding glass panels in closed position.

Referring more particularly to the drawings, there is shown a front door 1 of an automotive vehicle provided with a window opening 2 bounded on the outside by the reveal 60 and on the inside by the garnish molding 61. The opening is arranged to be closed by a slidable glass panel 3 and a pivoted glass panel 4. By way of example, panels 3 and 4 are shown in the same plane which is the preferable, though not the necessary, arrangement of the panels. The door 1 is provided with the window well 5 into which the sliding panel 3 retreats when lowered. The sliding panel 3 is guided along one edge both above and below the belt line by the straight glass run channel 6 and along the other edge below the belt line by the straight glass run channel 7. The front edge 8 of the slidable panel 3 is inclined and has fixed thereto the H-sash channel 9 which is provided with the extension 10 which projects below the bottom edge of the glass and is guided in its up and down movement in the channel run 7. The H channel 9 has two forwardly projecting flanges 70 and 71. The flange 70, when the panels 3 and 4 are closed, overlaps the rear edge 30 and inside face of the pivoted panel 4 and the forwardly projecting flange 71 overlaps the outside face of the panel 4.

The lower edge of the slidable panel 3 has fixed thereto the sash channel 11 which carries the channel bracket 12. The slidable window panel 3 may be raised by any suitable window regulator, but is preferably raised and lowered by a two-point suspension window regulator of the type shown. This regulator carries a pair of studs 13 which slidably engage in the bracket 12, one on each side of the center line of the window so that the window is prevented from cocking as it is raised and lowered.

Figure 7:
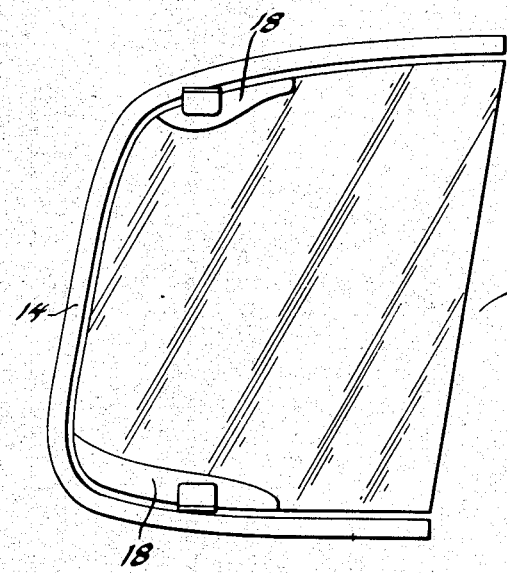
Figure 7 shows the unit assembly of the weatherstrip channel and the pivoted glass panel prior to mounting in the window opening.

The panel 4 is arranged to be pivoted in the window opening at its top and bottom edges somewhere between its front and rear edges. To this end there is provided a channel or weather-strip supporting member 14 (Figure 7), which conforms to the contour of the forward portion of the window opening. This channel member 14 has riveted thereto, as at 15, the supports 16 which carry the ball members 17 of the ball and socket pivot for the swinging panel. The swinging panel 4 has secured to its upper and lower edges the glass brackets 18 (Figures 5 and 7). The glass bracket 18 is provided with a channel 19 for reception of the glass panel 4. The bracket 18 has a T-shaped recess 20, (Figure 6) the inner portion 21 of which is spherical for the reception of the ball 17. A friction plug 22 is mounted in the recess 20 and has a spherical portion which cooperates with the spherical portion 21 of bracket 18 to form a socket for the ball 17. The friction plug 22 is backed up by a coil spring 23 which in turn is backed up by the block 24. The block 24 is held in the recess 20 by the screws 25. Hence, the spring 23 can be loaded by turning down screws 25 to cause the block 22 to frictionally engage the ball 17.

After the swinging glass panel 4 has been secured to the weather-strip channel or supporting member 14 by the ball and socket pivots, as above described, the unit assembly is placed within the window opening 2 and the window swung outwardly whereupon the channel 14 can be secured in the window opening by any suitable means such as the screws 26. After the channel 14 and associated swinging panel 4 have been secured in the window opening the weather-strip 27 is then secured in the channel 14.

Figure 4:
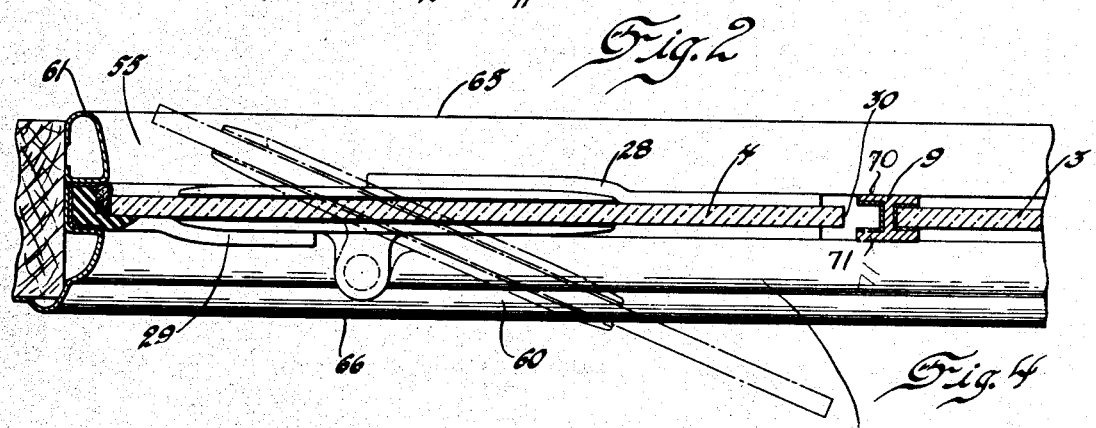
Figure 4 is a section along the line 44 of Figure 2.

The weather-strip 27 is provided on its inside edge to the rear of the pivots with the lip portions 28 which overlap to the rear of the pivots the top and bottom edges of the panel 4 along its inner face when the panel is closed. The weather-strip 27 is also provided along the outer edge and forward of the pivots of the panel 4 with a lip 29. The lip 29 overlaps the forward edge and outside face of the swinging panel when closed and follows the contour of the window opening from a position slightly forward of the upper pivot to a position slightly forward of the lower pivot. The weather-strip 27, including the lips 28 and 29, is made from moulded rubber and provided with a sponge rubber insert 50, the exposed surface of which is covered with any suitable fabric 51. This fabric cover 51, in swinging panel 4 to closed position, serves as a slide surface over which the edge of the panel rides thus enabling the panel to distort or compress the sponge rubber insert 50 to effect a good seal. The fabric covering for the sponge rubber insert tends to prevent bunching or massing of the sponge rubber before the closing panel, thus facilitating the closing of the panel nicely against the lips 28, 29 and in alignment with locking channel 9. The overlapping lips 28, 29 serve as locating stops to align the panel 4 in the plane of the panel 3 and likewise permit the window to be swung only from the closed position outwardly in a clockwise direction as viewed in Figures 2 and 1. In other words, the stops 28 and 29 prevent the window from being swung from closed position inwardly so that the portion of the panel 4 to the rear of the pivots will project inwardly adjacent the steering wheel and interfere with the driver. The lips 28 and 29 also properly position panel 4 in the window opening in alignment with panel 3 and associated channel 9 so that when the panel 3 is raised the channel 9 will slide along the rear edge of, and in interengaging relation with, the panel 4. Figures 4 and 3 very nicely show how the stop lips 28 and 29 of the weatherstrip 27 cooperate in the closing of the panels with the pivoted panel 4 and the forwardly projecting flanges 70 and 71 of the channel 9. As shown in Fig. 4, the panel 4 has been swung to closed position against the stops 28 and 29 and the sliding panel 3 is being closed. It will be noted that the swinging panel 4 has abutted the stops 28 and 29 and that the stops have properly aligned the rear edge 30 of the panel 4 with the mouth of the H channel 9 and so positioned the rear edge of the panel 4 relative to both of the projecting flanges 70 and 71 that the said flanges will slide into overlapping relation with the rear edge of the panel 4, as shown in Fig. 3, and thereby the possibility of the flanges 70 and 71 jamming or colliding with the rear edge 30 of the pivoted panel 4 is obviated. For purposes of aligning the panel 4 with the H channel 9 and properly positioning the rear edge of the panel 4 with respect to the flanges 70 and 71, only one of the stop lips 28 and 29 is necessary but, of course, both top and bottom lips 28 and the forward lip 29 are provided to effectively seal the edge of the panel 4.

It is apparent from the above description that the swinging panel 4 and associated supporting members including brackets 18, supports 16, pivots 17, and channel member 14 can be assembled upon the bench and installed as a unit in the window opening, thus insuring that the swinging panel 4 will be perfectly positioned in the window opening 2 and obviating the necessity for the workman to pursue a cut and try method in installing the swinging panel in the window opening.

It will be noted that the rear edge 30 of the panel 4 is inclined from the vertical or relative to the runways 6 and 7 which define the path of the panel 3, to correspond to the inclination of the front edge 8 of the sliding panel 3. Although it is the broad object of the invention to arrange the sliding and pivoted glass panels so that they will interlock when in closed position or partially closed position to prevent the swinging panel from being swung out of the plane of the slidable panel, it is desirable that the interlocking relation between the two panels be destroyed without the necessity for completely lowering the slidable panel. Hence, to this end the forward edge 8 of the slidable panel and the rear edge 30 of the swinging panel 4 are correspondingly inclined. Thus, when the sliding panel 3 is being lowered it gradually draws away from the pivoted panel 4 to form a gap (Figure 2), and when lowered a few inches the interlock between the two panels is broken. At this time (Figure 2) the rear edge 30 of the panel 4 is clear of the H channel 9 and hence is free to be swung outwardly. By increasing the inclination of the adjacent edges of the panels, a quicker release of the pivoted panel is obtained because the inclined edge of the slidable panel will thus draw away more quickly from the adjacent edge of the pivoted panel to thus clear the pivoted panel from the H channel.

Figure 2:
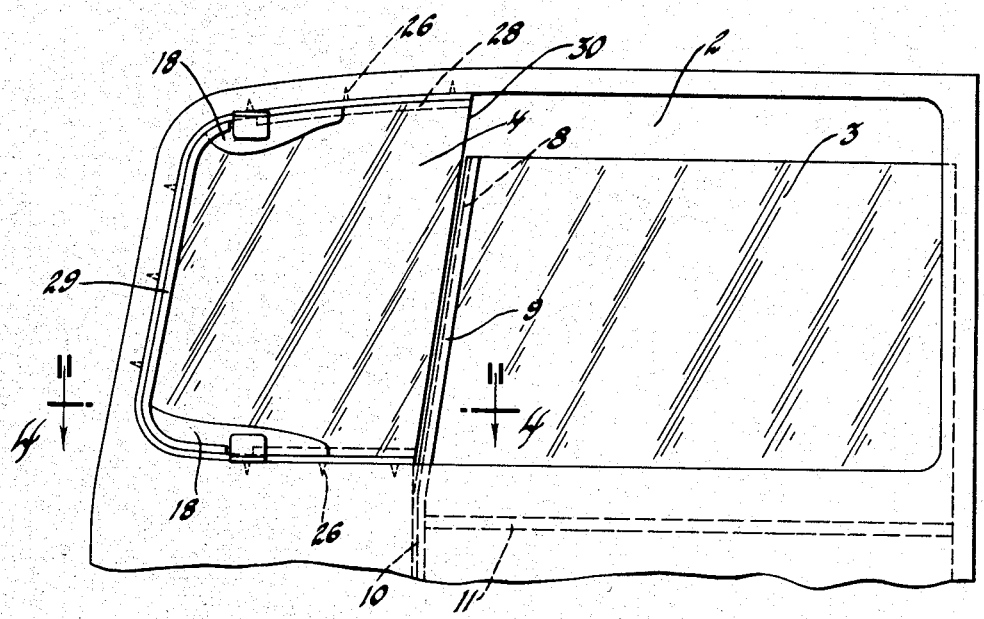
Figure 2 is a fragmentary view of the window assembly showing the slidable panel partially lowered and showing the gap between the slidable panel and the pivoted panel so that the latter can be swung out of the plane of the slidable panel.

In operation when the panel 4 is swung to closed position, and the panel 3 raised to closed position, as shown in Figures 1 and 3, the panel 4 is locked against swinging by the H channel 9. This effectively locks the swinging window panel and prevents any unauthorized person from swinging the window panel to open position and then reaching through the window opening to either release the locking dog which locks the outside door handle or from retracting the latch bolt by the inside door handle. If the panel 3 is lowered sufficiently the H channel 9 will draw away from the panel 4 thereby releasing the panel 4 so that it can now be swung within a range of approximately 90° for various wind deflecting and exhausting positions, as shown in the dotted lines (Figures 3 and 4), or from approximately 90° to somewhat less than 180°, as shown in the dotted lines in Figure 3, to serve as a scoop for deflecting air into the body. When the window is swung to the position shown in the dotted lines, Figure 4, the rounded upper and lower forward edges of the glass ride over and somewhat distort the overhanging lips 28, but when the inner and outer faces of the panel 4 engage flatly against the lips 28 and 29, the lips serve as abutments and prevent the portion of the panel to the rear of the pivots from being swung inwardly. The lip 29 extends along both the bottom and the top of the window opening forward of the pivot. These two portions are joined by a vertical portion, thereby forming a U like lip which is arranged to engage as an abutment and stop the forward outside edge of the swinging glass panel.

It will be noted that when the panel 4 is swung outwardly to the position shown in the dotted lines (Figure 4) there is not only a gap between the rear edge 30 of the panel 4 and the front edge of the panel 3 as at 54 but also a gap between the forward edge of the panel 4 and the front portion of the window opening as at 55. Thus, when the vehicle is in motion air will be exhausted from the inside of the body through the gap at the rear edge of the panel 4. If additional ventilation is desired the slidable panel 3 can be partially or entirely lowered.

This invention is particularly useful as a window assembly at the sides of the rear portion of any automotive vehicle such as a sedan for bringing air into, or exhausting the same from, the vehicle body. It is also understood that the pivoted panel may be mounted either to the front or the rear of the slidable panel.

Another object of the invention is that of obtaining the maximum amount of controlled ventilation through the portion of the window opening which is closed by the swinging panel with a minimum projection of the swinging panel beyond the window opening reveal. It has been found that by increasing the overhang of the swinging panel beyond the reveal that the noises caused by the air when the vehicle is in motion are increased. Hence, to achieve this result the swinging panel 4 is mounted in the window opening between the inside face 65 of the garnish moulding and the outer face 66 of the reveal and preferably, as shown in the drawings, between the garnish moulding and the reveal upon pivots which lie between the front and rear upright edges of the panel.

No claim is made in this application to the general arrangement of the swinging and sliding panels or these panels per se, as this is the invention of Alfred J. Fisher, and is the subject matter of the co-pending application, Serial No. 644,622, filed November 28, 1932, Patent No. 2,048,605.

I claim:

1. A window assembly and ventilator for a side window opening in an automotive vehicle comprising a pair of glass panels one of which is slidable upwardly and downwardly in the said opening and the other of which is pivotally mounted to swing on an up and down axis to open position with the normal rear edge to the outside of the vehicle to act as a ventilating wing, said panel also arranged to swing to closed position, and locking means carried by one of said panels arranged to automatically engage the other panel within the window opening whereby the pivoted panel is locked against swinging when closed and when the slidable panel is raised and is automatically released for swinging when the slidable panel is lowered.

2. A window assembly for an automotive vehicle having a window opening comprising a pair of glass panels for jointly closing the said window opening, one of said panels being slidably mounted for upward and downward movement and the other of said panels being pivotally mounted to swing upon an up and down axis, one of said panels having an inclined edge, and locking means associated with the inclined edge of one of said panels for automatically locking the pivoted panel when closed against swinging movement when the slidable panel is in raised position and for automatically releasing the pivoted panel as the slidable panel is lowered.

3. A window assembly for an automotive vehicle having an opening comprising a pair of glass panels for closing the said opening, one of said panels being slidable upwardly and downwardly and the other of said panels being pivoted to swing about a substantially vertical axis, the adjacent edges of said panels being inclined, a locking member carried by an inclined edge of one of said members and arranged to overlap the inclined edge of the other panel when both panels are in closed position whereby the slidable window draws away from the inclined edge of the pivoted panel while being lowered to release the pivoted panel for swinging action.

4. A window assembly for an automotive vehicle having a window opening comprising a pair of glass panels for closing the said opening, one of said panels being pivoted at its top and bottom edges in the window opening, the other of said panels being slidable upwardly and downwardly in a straight line path, the said panels when in closed position lying in the same plane and having their adjacent edges inclined relative to the straight line path of the slidable panel, a channel member carried by one of said members and arranged to overlap the other of said members between its top and bottom edges for interlocking the pivoted and slidable panels when they are in closed position whereby a partial lowering of the slidable panel releases the panel members from interlocking relation and permits the pivoted panel to swing.

5. A window assembly for an automotive vehicle having a window opening comprising a pair of glass panels for closing the said opening, one of said panels being slidable upwardly and downwardly in the said opening and the other of said panels being pivoted at its top and bottom edges for swinging into and out of the plane of the slidable panel, a channel member carried by one of the edges of the said panels for engaging the adjacent edge of the other panel when the panels are in closed position, a weather-strip carried in the window opening for sealing the edges of the said pivotal panel, the said weather-strip having a lip for overlapping a face of the pivoted panel whereby when the pivoted panel is swung to closed position the said panels are aligned in the same plane and the channel carried by the edge of the one panel can receive the other panel when the slidable panel is raised.

6. The combination with a vehicle having a frame defining a window space, of a window assembly for a vehicle, comprising a pair of adjoining glass panels arranged to complementarily control said window space, the rear panel being slidable up and down in part of said window space and the other of said panels being pivoted to swing in the remaining window space on an up and down axis intermediate the front and rear edges of the panel into and out of the plane of the slidable panel, a three lip resilient weatherstrip mounted in part of the window space for sealing the edges of the pivoted panel and keeping the swinging panel when closed in a predetermined relation with respect to the sliding panel, said weatherstrip having a body with a lip at the top and a lip at the bottom of the window space and both to the rear of the panel pivot for abutting the inside face of the pivoted panel when such panel is in closed position and a lip forward of the pivot for sealing the edges of the panel forward of the pivot and engaging the outside face of the swinging panel when the panel is in closed position.

7. In a window assembly for an automotive vehicle having a window frame defining window space, a unit glass panel assembly for insertion in a portion of said window space, comprising a separate U frame member arranged to be set in and conform to a part of the contour of said frame member and to also pivotally support a swinging panel, the said glass panel pivotally mounted intermediate its front and rear edges upon the said supporting member, whereby assembly of the U frame member into the window space positions the pivoted glass panel in such space, and a resilient weatherstrip supported by said supporting member arranged to engage the swinging panel on opposite sides of the pivot, the weatherstrip on one side of the pivot engaging one face of the panel, and the strip on the opposite side of the pivot engaging the opposite face of the panel.

8. A window assembly and ventilator for a side window opening in an automotive vehicle comprising a pair of glass panels one of which closes a portion of the window opening and the other of which closes the remaining portion of the window opening, one of said panels being swingable on an up and down axis to open and closed position and the other of said panels being movable up and down to open and closed position, an edge of the one panel being adjacent and extending along an edge of the other panel when the panels are in closed position, the edge of the movable panel immediately drawing away from the adjacent edge of the swinging panel when the movable panel is moved to open position, and means carried by an adjacent edge of one of the said panels for interengaging the adjacent edges of the said panels to automatically lock the said pivoted panel when in closed position against swinging when the other panel is moved to closed position and to automatically release the said pivoted panel as the said edge of the other panel draws away from the said adjacent edge of the pivoted panel when the panel is moved to open position.

9. A window assembly and ventilator for an automobile window opening comprising a pair of glass panels, one of said panels being swingable on an up and down axis and the other of said panels being movable to open and closed position, an edge of the one panel being adjacent and extending along an edge of the other panel when the panels are closed, the edge of the movable panel drawing away from the adjacent edge of the swinging panel during the initial portion of the opening movement of the said movable panel and drawing towards the adjacent edge of said swinging panel during the final portion of the closing movement of said movable panel, and means carried by an adjacent edge of one of the said panels for automatically interlocking the adjacent edges of the said panels during the final portion of the closing movement of the movable panel to lock the said pivoted panel when closed against swinging and for automatically unlocking the adjacent edges of said panels as the said edge of the movable panel draws away from the adjacent edge of the pivoted panel during the initial opening movement of the movable panel to release the said pivoted panel for swinging.

10. A window assembly and ventilator for a side window opening in an automotive vehicle comprising a pair of glass panels one of which closes a portion of the window opening and the other of which closes the remaining portion of the window opening, one of said panels being swingable on an up and down axis to open and closed positions and the other of said panels being slidable up and down to open and closed positions, an edge of the one panel being adjacent and extending along an edge of the other panel when the panels are in closed position, the edge of the slidable panel immediately drawing away from the adjacent edge of the swinging panel when the slidable panel is moved to open position, and a channel having an H cross section carried by an adjacent edge of one of the said panels for interengaging the adjacent edges of the said panels when the pivoted panel is in closed position to lock the said pivoted panel against swinging when the other panel is moved to closed position and to release the said pivoted panel as the said edge of the slidable panel draws away from the adjacent edge of the pivoted panel when the slidable panel is moved to open position.

11. A window assembly and ventilator for a side window opening in an automotive vehicle comprising a pair of glass panels one of which is slidable up and down in the said opening and the other of which is pivotally mounted to swing on an up and down axis to open position with the normal rear edge to the outside of the vehicle to act as a ventilating wing, said panel also arranged to swing to closed position, the said slidable panel being arranged to draw away from the swingable panel during its initial sliding opening movement to form a gap between said panels and to draw toward the pivoted panel during its final closing movement to close said gap, and locking means carried by one of said panels arranged to engage the other panel within the window opening during the final portion of the closing movement of said sliding window whereby the pivoted panel is automatically locked against swinging when closed and said locking means being arranged to disengage said other panel during the initial portion of the opening movement of said sliding panel whereby said swinging panel is automatically released for swinging.

12. An automobile ventilating window assembly comprising two panels mounted in the window opening with the rear edge of the one adjacent the front edge of the other when said panels are closed, one of said panels being pivoted on an up and down intermediate axis and the other slidable up and down independently of said pivoted panel into and out of said window opening, a sealing member fixed to the said edge of one of said panels, said member having a flange extending along and projecting from the said edge and arranged to overlap said other edge and thereby close the space between the said panels when closed, and a resilient weatherstrip mounted along the window opening for sealing the edges of the pivoted panel, said weatherstrip having a lip arranged to abut the outside of the pivoted panel at one side of the pivot and two lips to abut the inside of the panel at top and bottom but at the other side of the said pivot when swung closed to serve as weather seals and stops for positioning the adjacent front and rear edges of said panels and the said sealing member and flange whereby when the sliding panel is slid to closed position the said flange overlaps one of the adjacent edges of the said panels and the space therebetween is closed.

13. An automobile ventilating window assembly comprising two panels mounted in the window opening, one of said panels acting as a ventilator and being pivoted on an up and down axis and the other slidable up and down independently of said pivoted panel into and out of the said window opening, the rear edge of the pivoted panel being adjacent the front edge of the sliding panel when said panels are closed, a channel member fixed to the front edge of the sliding panel and having a forwardly projecting flange approximately co-extensive with the front edge of said slidable panel and slidable with respect to the rear edge of the pivoted panel to overlap the same and thereby close the space between the said panels when closed, and a rubber weatherstrip mounted along the edge of the window opening for sealing the top, bottom and front edges of the pivoted panel, said weatherstrip having a lip arranged to abut the face of the pivoted panel when closed to serve as a stop for aligning the adjacent edges of the said panels when closed and positioning the said pivoted panel with respect to said flange whereby when the sliding panel is slid to closed position the said flange slides into overlapping relation with the rear edge of the closed pivoted panel.

14. The combination with a vehicle having a frame member, of a window assembly having a pair of glass panels functioning within the frame member for controlling the space enclosed by the frame member, the said panels when in closed position lying in substantially the same plane, one of said panels being slidable up and down into and out of part of the space enclosed by the frame member and the other of said panels being pivoted to swing in the remaining space defined by the said frame member, a U frame carrying the pivoted panel assembled therein and the unit fixed in the said frame, said panel swinging on an axis intermediate the rear and the front edges of such panel, and a rubber weatherstrip secured in said U frame and defining a substantial U and having integral projecting lip portions, one located along the top run of said strip to the rear of the panel pivot and the second lip portion located along the bottom run of the strip to the rear of the pivot, said two lips arranged to engage the inside face of the swinging panel when said panel is in closed position, and a third lip portion projecting from the strip and located forward of the pivot and arranged to seal the edges of the swinging panel forward of the pivot and abut against the outside face of said panel when in closed position.

15. In a vehicle body having a metal panel with a reveal defining a window opening, a window assembly comprising a pair of glass panels functioning within the window opening to control the closure of the same, one of said panels being pivoted on an up and down axis between its front and rear edges for controlling the front portion of the window opening and the other of said panels being slidable up and down within the remaining portion of the opening, a U like frame insertable in said window opening carrying said pivoted panel, the said pivoted panel which is swingable about its up and down axis to open position to act as a ventilating wing with the normal rear edge positioned outside of the vehicle, weather-sealing means carried by one of the up and down edges of one of the panels arranged to overlap the adjacent up and down edge of the other panel for sealing the joint between said edges when the panels are in closed position, a weatherstrip carried by said U like frame for sealing the edges of the pivoted panel, said weatherstrip having a body with a lip at the top and a lip at the bottom of the window opening and both lips positioned to the rear of the pivots for the pivoted panel and arranged to abut the inside face of the pivoted panel when such panel is in closed position to serve as locating stops and weather seals for said pivoted panel and to so position said pivoted panel relative to said weathersealing means whereby when the pivoted panel is in closed position the said weathersealing means can close the joint between the said adjacent edges of the panels and overlap the adjacent edge of the other panel when the sliding panel is slid in the window opening to closed position, and the said body having a third lip forward of the pivots along the outside edge of the body when the panel is closed bearing against the outer face of the pivoted panel along the bottom, top and front edges.

EMORY GLENN SIMPSON.

CERTIFICATE OF CORRECTION.

Patent No. 2,087,821.  July 20, 1937.

EMORY GLENN SIMPSON.

It is hereby certified that error appears in the printed specification of the above numbered patent requiring correction as follows: Page 3, second column, line 40, claim 3, after "inclined" insert the words upwardly of the sliding panel from bottom to top; and that the said Letters Patent should be read with this correction therein that the same may conform to the record of the case in the Patent Office.

Signed and sealed this 21st day of September, A. D. 1937.

Henry Van Arsdale
Acting Commissioner of Patents.

(Seal)